United States Patent Office 3,382,336
Patented May 7, 1968

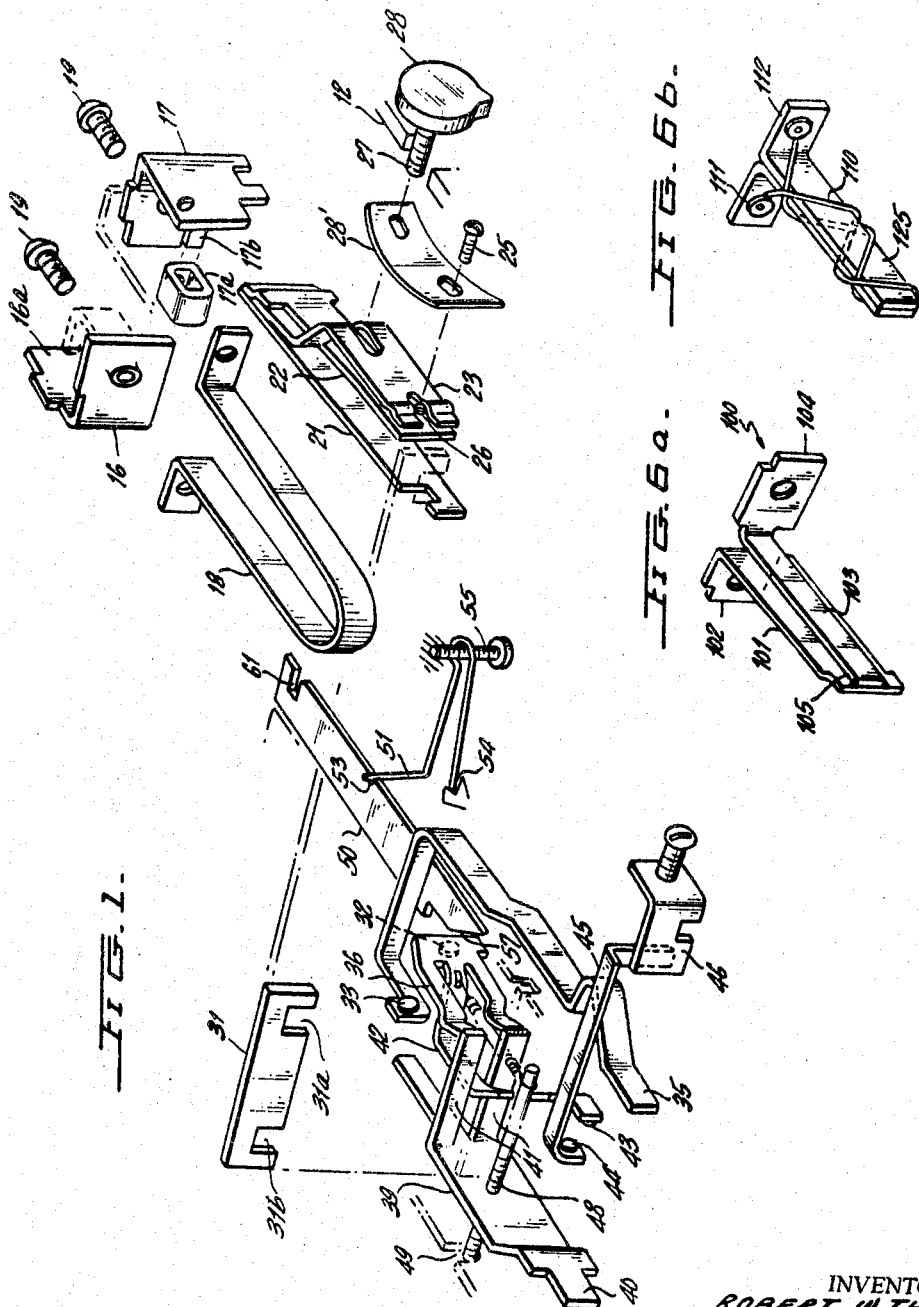

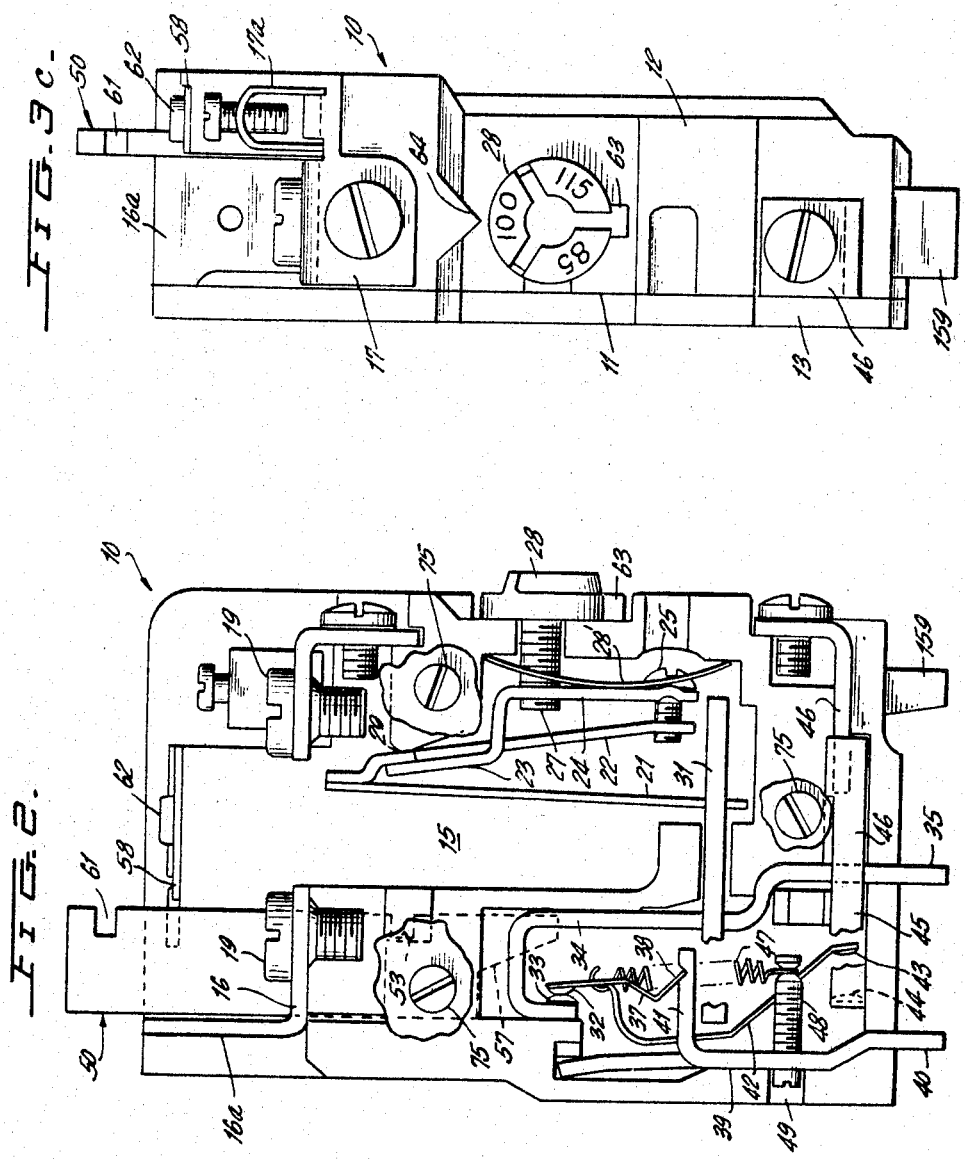

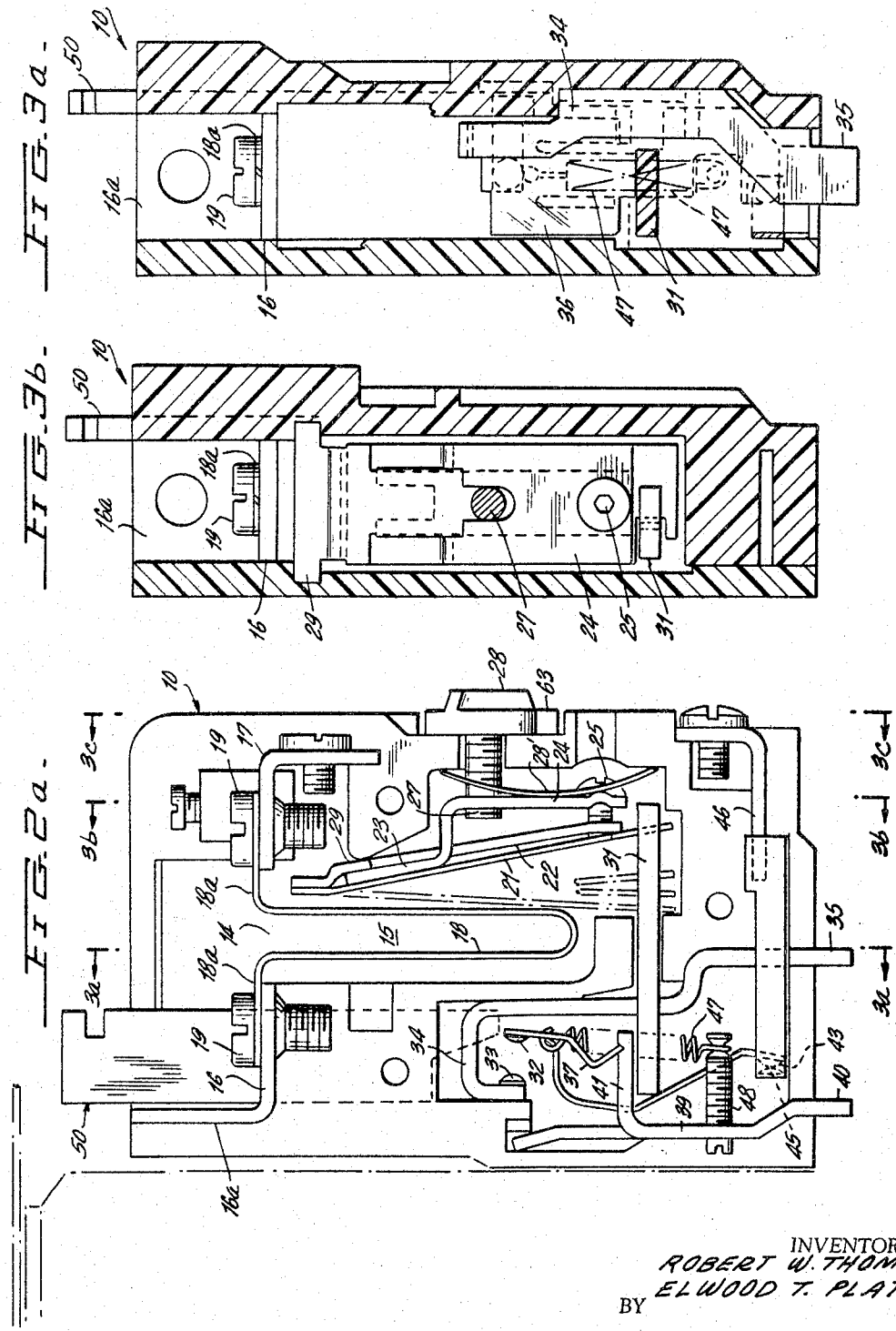

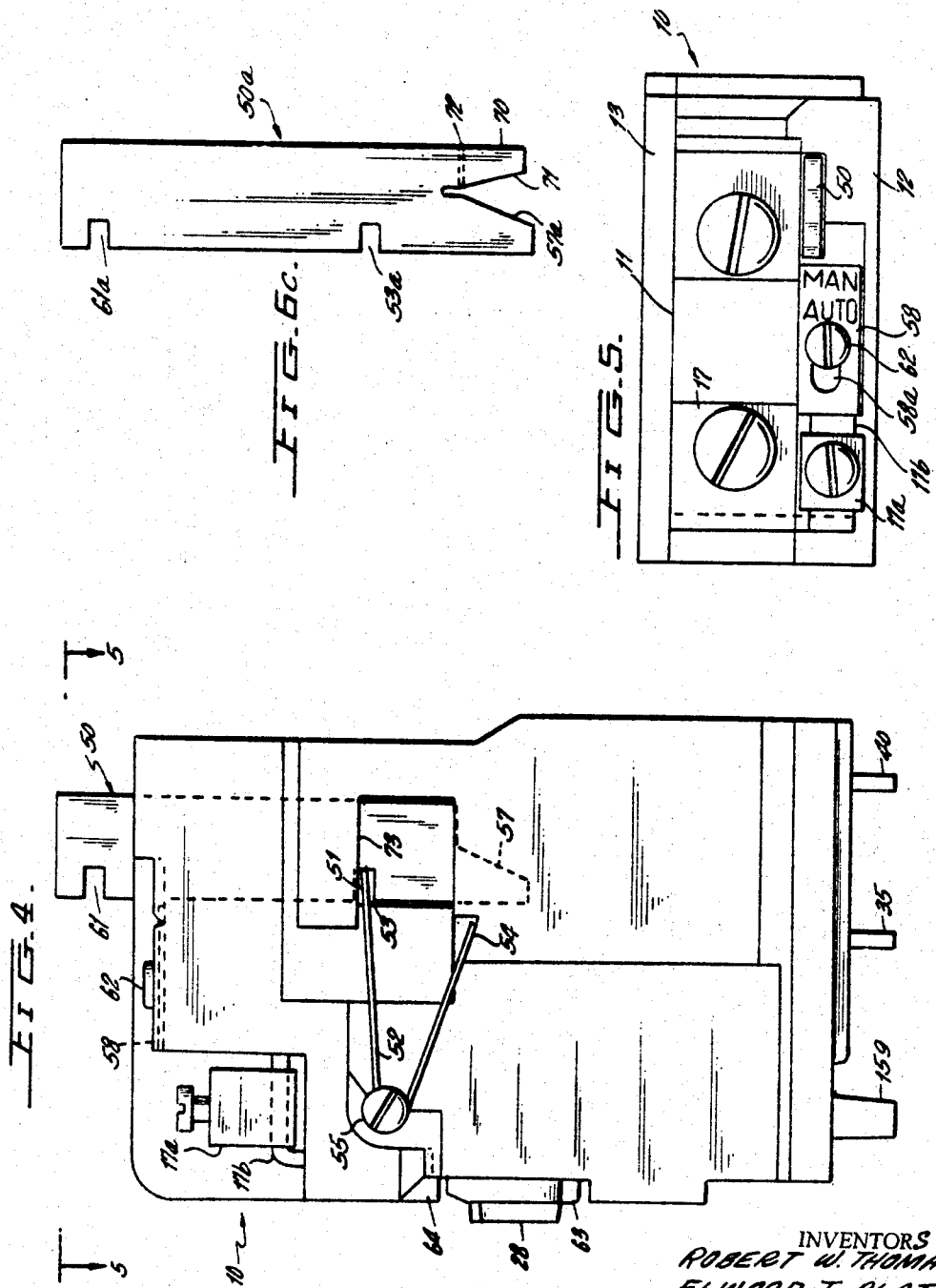

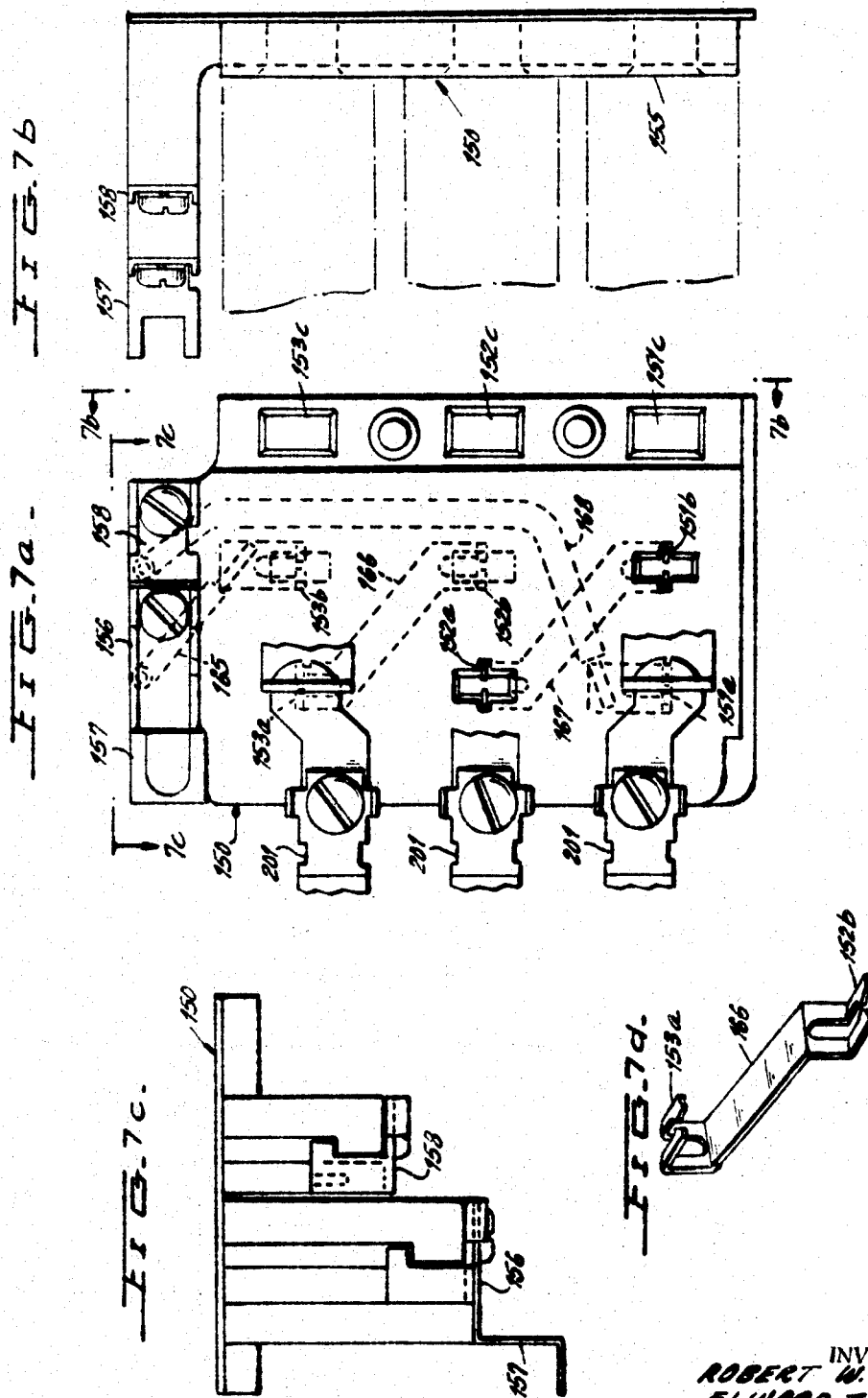

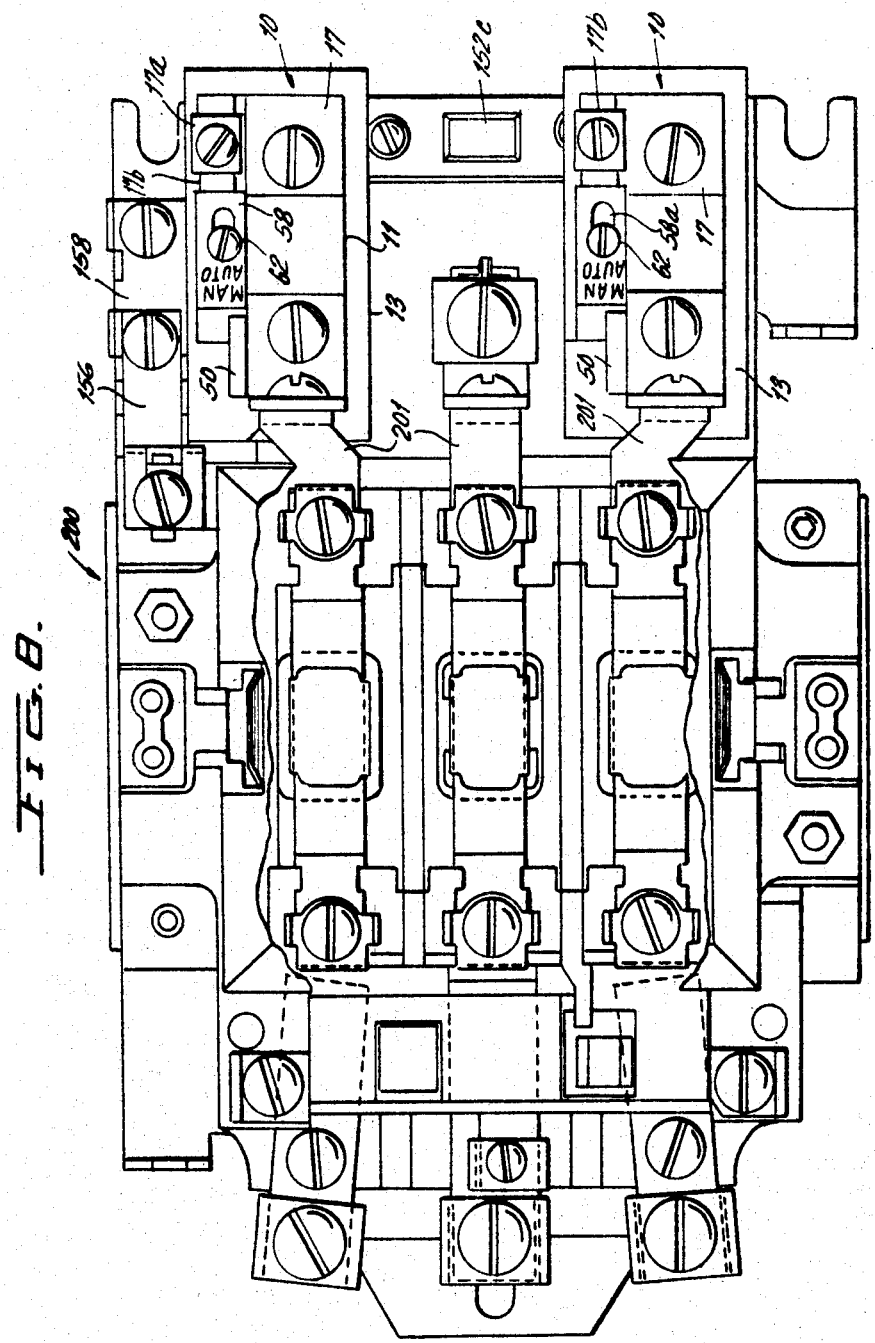

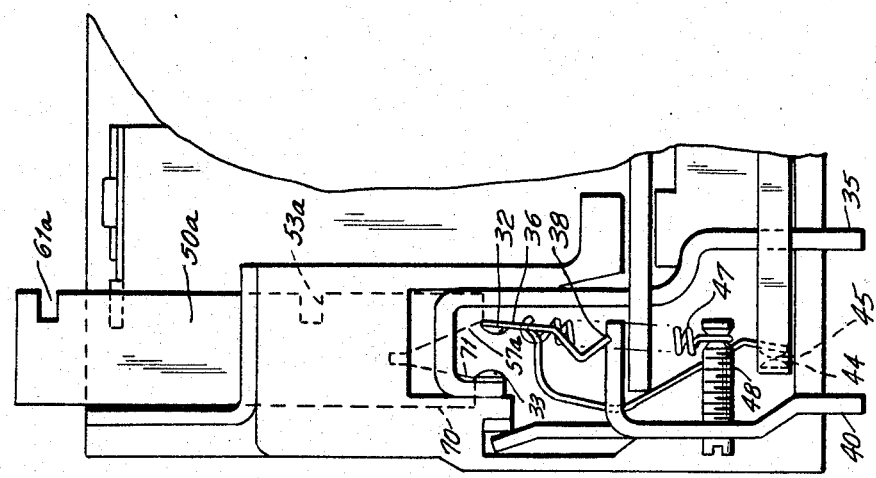
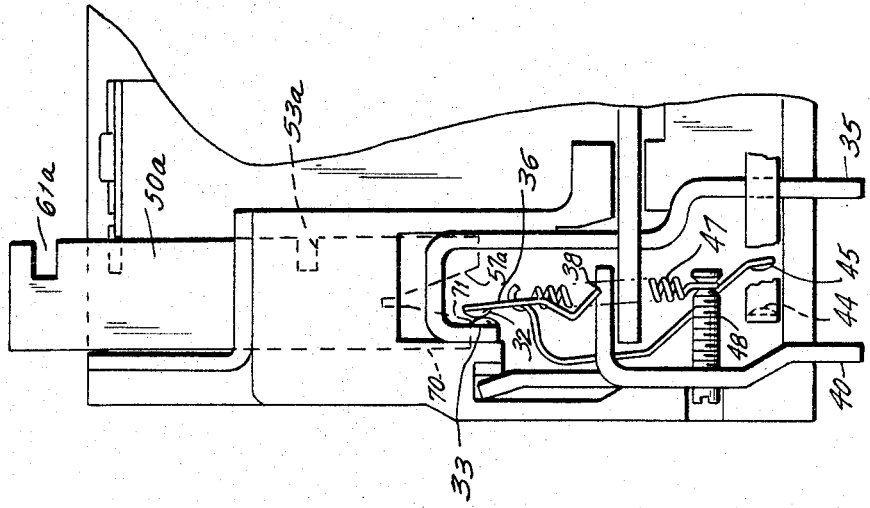

3,382,336
MANUAL OPERATOR AND LOCK MEANS THEREFOR FOR OVERLOAD PROTECTIVE DEVICE
Robert W. Thomas, St. Clair Shores, and Elwood T. Platz, Grosse Pointe Farms, Mich., assignors to I-T-E Circuit Breaker Company, Philadelphia, Pa., a corporation of Pennsylvania
Continuation of application Ser. No. 481,235, Aug. 20, 1965, which is a division of application Ser. No. 225,044, Sept. 20, 1962. This application Feb. 21, 1967, Ser. No. 617,714
11 Claims. (Cl. 200—122)

ABSTRACT OF THE DISCLOSURE

A manual operator for an overload protective device having a thermally actuated overload sensing bimetallic strip for tripping apart the contacts of the device; the manual operator is elongated with two inclined cam surfaces forming a wide mouthed notch; when the element is depressed: if the contacts are together, the first cam surface engages the contact arm of the movable contact and separates the contacts; or if the contacts are apart, the second cam surface engages the contact arm and drives the contacts together; an alternate form of operator has only the second cam surface and has a lock means to retain the element in a depressed position for automatic reclose.

---

This is a continuation of application Ser. No. 481,235 filed Aug. 20, 1965, which was a division of application Ser. No. 225,044 filed Sept. 20, 1962, entitled Overload Relay for Motor Starter. More particularly, this invention relates to a novel arrangement whereby each pole of a multi-pole arrangement is provided with a separate and distinct plug-in device, with all of the devices connected in electrical series for electrical coordination. Our novel overload relay device is constructed to be used as an independent piece of apparatus or in conjunction with a contactor to form a motor starter.

Essentially, our invention consists of a plug-in device a unitary assembly comprised of (a) a heating circuit, (b) a control circuit, (c) an adjustment means, (d) lost motion connector, (e) external control, and an adapter plate to which a plurality of the plug-in devices are mounted.

A. *Heater circuit*

The heater circuit is constructed so that the heater terminals are readily accessible from the external portion of the casing and the heater, therefore, is readily removable and replaceable without disassembling the casing.

Our device is so constructed so that a variety of heaters can be used, as for example, a U-shaped heater, a coil-wound heater, or a two-piece heater, depending on the electrical requirements of the circuit. When the overload relay is used with a contactor, the arrangement is such that one terminal of the heater is electrically connected to the main contacts of the contactor and the other terminal provides a connection preferably to the load terminal.

B. *Control circuit*

Within the same casing containing the heater circuit, a control circuit is located which comprises not only the control contacts for the control coil of the contactor, but also the auxiliary or signal contacts.

Essentially, the control circuit is comprised of a pivoted contact arm which forms one leg of a toggle and a biasing spring which forms the other leg of the toggle. The contact arm is constructed in such a manner that it is pivoted at a central point and carries the main contacts at one end and the auxiliary or signal contacts at the other end thereof. The control circuit is further constructed so that the terminals which provide the energization for the main contacts can either be plug-in terminals or standard screw type terminals. With the plug-in arrangement, the overload relay can be easily mechanically and electrically connected to a contactor by the simple expedient of providing an adapter plate with the contactor.

C. *Adjustment device*

The overload sensing means of our overload relay is comprised of a bimetal which is mounted on a support means comprised of a main support and auxiliary support. The auxiliary support is secured in position by a field adjustment means although the main and auxiliary support can be moved relative to each other by means of a separate and distinct factory calibration means. Both the factory calibration means and the field adjustment means are provided to permit a change in the position of the bimetal relative to the heater without distorting the bimetal.

The auxiliary support is constructed as a Z-shaped member with the connecting end and particularly the bend at each end being purposely made weak to permit factory calibration. The bimetal is secured at a first end and the other end thereof is free to deflect upon heating of the bimetal. There is an internal surface of the case which serves as a pivot for the assembly of the bimetal, the main support and, the auxiliary support.

D. *Lost motion connector*

As previously noted, the control circuit comprises a bimetal whose free end can be adjustably positioned and the control circuit comprises a toggle mechanism, one leg of which is a biasing spring. A lost motion translator is provided whereby movement of the bimetal away from the heater upon the occurrence of an overload current is transmitted through the translator to re-position the toggle spring so that the toggle is driven over-center thereby resulting in the simultaneous opening of the main contacts and closing of the auxiliary or signal contacts. However, as the bimetal cools the toggle spring is not moved back over center by the translator because of a lost motion arrangement.

E. *External control*

Means are provided in our novel overload relay whereby a single unit can perform several functions, such as a manual opening operation, a pre-set for automatic re-set operation, a manual re-set of the contacts from the open to the closed position, as well as manual opening plus lock-off. In essence, there is a plunger device provided with a first and second cam surface. The plunger device can be selectively altered so that with the first cam surface on the plunger the device can be manually opened even though the second cam surface is on the plunger. On the other hand, if it is desired to have automatic re-set operation, the first cam surface can be removed from the plunger and the second cam surface will thereby function as an automatic re-set means. When the plunger is utilized as a manual opening device, a first lock-off means can be provided to hold the plunger in the fixed position and when the plunger is used as an automatic re-set device the same locking means can be used to hold the plunger in position.

Thus, the plunger is provided with a first and second cam surface with the first cam surface utilized exclusively for manual opening operation and when the plunger has both a first and second cam surface, the second cam surface functions as a manual re-set surface. However, when the first cam surface is removed, the second cam surface functions both as a manual re-set surface and an automatic re-set surface. It should be noted that the plunger means is removable without disassembling the housings so that the first cam surface can readily be removed in the field, if so desired, without affecting the factory calibration or assembly.

It should be noted that the second cam surface, although in physical contact with the contact arm, merely moves the contact arm over center and does not physically drive the contact arm completely to the engaged position. That is, the second cam surface merely re-positions the toggle and this permits the spring of the toggle to serve as the quick-close means for the contact. Hence, the plunger in all positions thereof will permit a trip-free operation. It should be noted that undesirable pumping operation will not result since there is not an instantaneous trip means. That is, the main contacts will close and will not be moved to the open position until the bimetal is heated again but when the bimetal is heated, the contacts will be free to move in the open position until they engage the second cam surface.

F. *Adapted plate*

Means are provided whereby the base of the contactor can be extended to provide a mechanical support as well as the electrical connection for a plurality overload relay units. In particular, the adapter plate is provided with plug-in contacts and connecting straps that will automatically connect in all of the main contacts of the overload relays in electrical series.

The adapter plate is further provided with keying means or a recess to receive protrusions from the overload relay so that the overload relay plug-in contacts are in alignment with the female contacts of the adapter plate and also to insure that the heater terminal is in alignment with a terminal of the contactor.

Accordingly, a primary object of this invention is to provide a novel construction for an overload relay device.

Another object is to provide a novel overload relay of relatively simple construction which possesses reliable operating characteristics.

Still another object is to provide an overload relay having novel means for mounting of the bimetal.

A further object is to provide an overload relay having novel means for tripping and lockout.

A still further object is to provide an overload relay having a novel arrangement of the bimetal, motion translator, and toggle switch mechanism.

These and other objects of our invention will be obvious from the following description taken in connection with the drawings, in which:

FIGURE 1 is an exploded perspective showing the heater circuit, control circuit and adjustment means of our novel overload relay.

FIGURE 2 is a side view of the overload relay with the cover removed.

FIGURE 2a is a composite side and cross-sectional view similar to FIGURE 2 but illustrates the movement of the bimetal, the heater circuit, and the configuration of the plunger.

FIGURES 3a–3c are various and cross-sectional views of the motor starter in which FIGURE 3a is taken along line 3a—3a of FIGURE 2a looking in the direction of the arrows 3a—3a; FIGURE 3b is taken along the line 3b—3b of FIGURE 2a looking in the direction of arrows 3b—3b; and FIGURE 3c is an end view of the device of FIGURE 2 taken from the right end.

FIGURE 4 is a view of the other side of the casing of the overload relay.

FIGURE 5 is a top view of the overload relay of FIGURE 2.

FIGURE 6a is an illustration of a two-piece heater that may be substituted for the U-shaped heater of FIGURES 1 and 2.

FIGURE 6b is an illustration of a coil type heater.

FIGURE 6c is a side elevation of a slide utilized for manual tripping of the overload relay.

FIGURE 7a is a top view of the adapter plate.

FIGURE 7b is an end view of the adapter plate of FIGURE 7a.

FIGURE 7c is a side view taken in the direction of the arrows 7c—7c of FIGURE 7a.

FIGURE 7d is a perspective showing the construction of the female plug-in contacts.

FIGURE 8 is a composite plan view illustrating the overload relay and adapter plate of our invention in conjunction with a contactor.

FIGURES 9 and 10 are side cross-sections of a part of the relay shown in FIGURE 2 adapted with the slide of FIGURE 6c.

Now referring to the figures and more particularly to FIGURES 1 through 5. Overload relay unit 10 consists of a molded housing divided along line 11 to form base 12 and cover 13 joined by screws 75. In a manner well-known to the art, base 12 and cover 13 are provided with internal depressions and protrusions which engage the electrical and active mechanical elements of unit 10 to operatively position these elements.

With respect to FIGURE 2a, there is a top opening 14 which forms an entrance to main cavity 15 in base 12. Disposed externally of housing 10 at the top thereof are spaced apart main circuit terminals 16, 17, (as shown in FIGURE 1), each of which are generally L-shaped. A generally U-shaped resistance heater element 18 is disposed within main cavity 15 and is provided with out-turned legs 18a at the free ends of the U arms. Out-turned legs 18a are provided with clearance apertures which receive screws 19 for securing heater 18 to terminals 16, 17. An auxiliary wire connector 17a is mounted to extension 17b of terminal 17.

Disposed within cavity 15 and extending generally parallel to one of the legs of heater 18 is a bi-metallic element 21. The upper end of element 21 is fixedly secured as by welding to the upper end of main support member 22. Main support 22 extends between the arms 23 at the bifurcated upper end of auxiliary support 24 and is secured to auxiliary support 24 near the free ends of arms 23. The lower ends of supports 22 and 24 are joined together by factory calibration screw 25 extending through slot 26 in auxiliary support 24 and is received in a threaded aperture of main support 22. It is noted that arms 23 have two bends therein and that the cross-sectional areas of both arms 23 is less than the cross-sectional area of main support 22. Thus, upon manipulation of screw 25 the movement of main support member 22 relative to auxiliary support member 24 is accomplished by bending auxiliary support member 24.

At a point intermediate its ends, auxiliary support member 24 is provided with a threaded aperture which receives field adjustment screw 27 whose enlarged head 28 is disposed externally of housing 12, 13. Bowed leaf spring 28' is disposed within main cavity 15 with the ends thereof bearing against base 12 and the center portion thereof bearing against auxiliary support member 24 at a point thereof near its lower end. The action of spring 28' urges main support member 22 to seat itself against bearing surface 29 internal of base 12. Surface 29 forms a fixed point of reference about which bimetal 21 moves upon deflection thereof. Bimetal 21 is so constructed that the lower end thereof is free to deflect to the right with respect to FIGURE 2 when bimetal 21 is heated.

Bimetal 21, upon deflection thereof, acts through translator bar 31 to separate movable contact 32 from stationary contact 33 in a manner to be hereinafter explained. Stationary contact 33 is mounted to one end of conducting strap 34 whose other end constitutes plug-in terminal 35 extending from the bottom of housing 12, 13. Movable contact 32 is mounted to the upper end of contact arm 36 provided with bifurcated sections 37 whose free ends are entered into depressions 38 which constitute pivot points for movable contact arm 36. Depressions 38 are formed in the upper surfaces of spaced projections 41 extending horizontally from conducting strap 39 at a point intermediate the ends thereof. The lower end 40 of strap 39 constitutes a plug-in terminal extending externally of housing 12, 13.

Spring 47 is connected at its lower end to adjustable screw 48 and is connected at its upper end to contact arm 36. The center line of spring 47 extends to the left of the pivot 38 of movable contact arm 36 as seen in FIGURE 2 to thereby exert a force on the movable contact 32 to the left. However, when the bimetal 21 is heated to cause movement of the translator bar 31, the center line of spring 47 is moved to the right of the pivot 38 to thereby exert a force on the movable contact to the right as best seen in FIGURE 2(a).

Movable contact arm 36 includes a downwardly extending portion 42 positioned between arms 37 and extending between projections 41. Spring 47 is secured to the inner end of adjusting screw 48. Screw 48 is threadably mounted to conducting strap 39. Base 12 is provided with aperture 49 through which the slotted end of screw 48 is accessible for adjustment. The position of screw 48 positions the lower end of spring 47 thereby determining the point at which contacts 32, 33 will part as spring 47 is moved to the right by translator bar 31 upon heating of bimetal 21.

Slidably mounted within a suitable guideway of members 12 is reset slide 50. The down-turned end 51 of V-shaped spring 52 extends into housing window 73 and is received in side notch 53 of slide 50 while the other end 54 of spring 52 bears against an external surface of base 12. The apex of spring 52 is disposed below the head of screw 55 which secures spring 52 to base 12. Spring 52 is partially loaded in a direction such that the arms thereof are urged to separate thereby urging slide 50 to its outward position illustrated in FIGURE 2. In this position inclined reset surface 57 at the lower end of slide 50 is so positioned that when translator bar 31 moves the spring 47 sufficiently to the right of notches 38, with respect to FIGURE 2, movable contact 32 separates from stationary contact 33 by a sufficient distance so that upon cooling of bimetal 21 contacts 32, 33 will not automatically close.

With contacts 32, 33 separated, after reset slide 50 is moved downward with respect to FIGURE 2, surface 57 engages the upper end of contact arm 36 driving movable contact arm 36 over center to the left so that spring 47 is effective to move contact 32 into engagement with contact 33.

For automatic resetting, slide 50 is moved inward to a position where notch 61 is in line with locking member 58. Thereafter member 58 is moved to the left with respect to FIGURE 2 into notch 61. Locking screw 62, extending through elongated slot 58a of member 58, maintains member 58 in adjusted position.

Factory calibration for bimetal 21 is achieved by manipulating screw 25. As screw 25 is adjusted main support 22 and bimetal 21 are bodily moved as a unit. During this period of time auxiliary support 24 is essentially stationary although the upper portion thereof deforms to permit the aforesaid movement of main support 22. Field adjustment knob 28 is operated to rotate screw 27. This movement brings about the bodily movement of auxiliary support 24, main support 22 and bimetal 21 as a unit with bearing surface 29 acting as a pivot. It is noted that knob 28 is provided with a radial projection 63 which cooperates with base stop 64 to limit rotation of screw 27 to approximately one revolution.

It is noted that device 10 as hereinbefore described does not provide for manual tripping. Such provisions may readily be provided by removing reset slide 50 and replacing same by tripping slide 50a. Slide 50a (FIGURES 6c, 9 and 10) contains all of the features of slide 50 and in addition contains a portion 70 at its lower end including tripping cam surface 71. It is noted that portion 70 is connected to the remainder of slide 50a at a weakened section 72 which defines a fracture line so that portion 70 can be broken away should it be desired to eliminate the manual tripping feature.

Slide 50a may be substituted for slide 50 merely by removing spring tip 51 from notch 53 thereby permitting slide 50 to be moved upward out of housing 12, 13. Thereafter slide 50a is inserted and is maintained in operative position by placing spring tip 51 into notch 53a when the latter becomes viewable at base window 73.

Referring to FIGURE 9, with contacts 32, 33 in closed position, downward movement of slide 50a from the fully projected position brings tripping cam surface 71 into engagement with movable contact arm 36 moving the latter clockwise, as viewed in FIGURE 9, about pivot depressions 38 to separate contact 32 from contact 33. Upon subsequent release of slide 50a spring 52 moves slide 50a upward thereby permitting spring 47 to move contact 32 back into engagement with contact 33.

Referring to FIGURE 10, should contacts 32, 33 be separated through the deflection of bimetal 21, those contacts may be brought back into engagement after cooling of bimetal 21 by depressing slide 50a. This movement of slide 50a brings cam surface 57a into engagement with the upper end of movable contact arm 36 moving the latter counterclockwise, as viewed in FIGURE 10 to a position where the toggle is over center to the left thereby permitting spring 47 to drive movable contact arm 36 into engagement with tripping cam surface 71 and upon release of slide 50a movable contact 32 will engage stationary contact 33.

In order to maintain contacts 32, 33 disengaged, as during a period when related equipment is being serviced, slide 50a may be maintained in its inward position by moving locking member 58 to the left, with respect to FIGURE 9, into slot 61a at the edge of manual tripping slide 50a.

In the device hereinbefore described, the bimetal heater consists of a single piece U-shaped resistance element 18. Element 18 may readily be replaced without removing screw 75 which secures cover 13 to base 12. That is, it is merely necessary to remove screws 19 from terminals 16, 17 and thereafter move heater 18 upward with respect to FIGURE 2.

Heater 18 may be replaced by either of the heater constructions illustrated in FIGURES 6a or 6b. The heater assembly 100 of FIGURE 6a comprises copper conducting strap 101 whose out-turned end 102 is adapted to abut terminal 16. Heater asesmbly 100 also includes resistance leg 103 extending generally parallel to leg 101 and spaced therefrom. The outwardly turned end 104 of leg 103 is adapted to abut terminal 17. Legs 101 and 103 are combined as by welding at 105. In heater assembly 100, heating is concentrated in leg 103 which is positioned closer to bimetal 21 than is leg 101. For some applications bimetal 21 appears to be more sensitive to heat generated by heater 100 than by heater 18.

FIGURE 6b illustrates a heater in the form of resistance wire 110 which is spiraled about insulating support 125 in two layers. The eyelet conected ends 111, 112 of coil 110 are adapted to be connected to terminals 16 and 17 by means of screws 19.

With contacts 32, 33 in engagement a complete electrical path exists between plug-in terminals 35 and 40. This path comprises terminal 35, conducting strap 34 to stationary contact 33, movable contact 32, movable contact arm 36, and conducting strap 39 to terminal 40. This series circuit is intended to be connected in series with the operating coil for contactor 200 as shown in FIGURE 8.

With reset slide 50 or tripping slide 50a in the fully extended position and contacts 32, 33 disengaged, contacts 43, 44 will be in engagement. This completes a series circuit extending from terminal 40 through conducting strap 39, movable contact arm 36, extension 42, movable contact 43 through stationary contact 44, and strap 45 to terminal member 46. The last noted circuit is used for signalling purposes to indicate when unit 10 has been tripped open and must be manually reset.

Overload relay units of the type described are usually in conjunction with contactors for controlling the energization of motors. This combination is effectively achieved by providing plug-in base 150 as illustrated in FIGURE 7a–7d. When used in cnjunction with a three phase contactor 200, plug-in base 150 comprises three pairs of spaced contact receiving jaws 151a, 151b; 152a, 152b; 153a, 153b. These contact receiving jaws are mounted to the main portion 155 of plug-in base 150 which is also provided with a plurality of locating apertures 151c, 152c, and 153c in alignment with the respective pairs of contact receiving jaws. Plug-in base 150 is also provided with an end portion 156 which extends at right angles to main portion 155 and is stepped to provide seats for terminals 157, 158.

Depressions 151c, 152c and 153c are adapted to receive a projection 159 extending downwardly from the bottom of base 12 for positioning unit 10. With projection 159 of unit 10 disposed within depression 151c contact jaws 151a engage contact 40 and contact jaws 151b engage contact 35. Similar units 10 are mounted in the plug-in base 150 at locations defined by depressions 152c and 153c.

Disposed within plug-in base 150 are conductors for establishing a series circuit from terminal 157 to terminal 158 when three closed overload relay units 10 are mounted to base 150. Thus, conductor 165 extends from terminal 157 to jaws 153b, conductor 166 extends from jaws 153a to jaws 152b, Conductor 167 extends from jaws 152a to jaws 151b, and conductor 168 extends from jaws 151a to terminal 158. As seen in FIGURE 7d jaws are formed on both ends of conductor 166 and formed integrally therewith. For a situation where only the outer locations defined by depressions 151c and 153c are to be utilized a strap is placed between jaws 153a and jaws 151b.

With plug-in base 150 properly mounted at one end of contactor 200, when an overload relay unit 10 is mounted to base 150 this unit 10 is automatically positioned with the upturned portion 16a of its main terminal 16 abutting a main contact terminal 201 of contactor 200.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. An overload protective device comprising, a pair of cooperating contacts,
    an overcenter toggle for operating one of said contacts into and out of engagement with the other of said contacts; said toggle including a contact arm to which is mounted said one contact of said pair of contacts;
    an operating mechanism comprising, a first cam having a first cam surface means; a second cam having a second cam surface means; and a manually operable member for operating said first and said second cams in a first direction; said first and said second cams being connected to said manually operable member so as to be simultaneously movable thereby in the first direction;
    said first cam surface means operating into engagement with said contact arm when said pair of contacts is engaged for moving said one contact out of engagement with said other contact; said first cam surface means being shaped and positioned to slidably engage said contact arm; whereby first actuation of said manually operable member in said first direction moves said one contact out of engagement with said other contact;
    said second cam surface means operating into engagement with said contact arm when said pair of contacts is disengaged for moving said one contact toward said other contact and toward the apex of a notch formed by said first and said second cam surfaces; said second cam surface means being shaped and positioned to slidably engage said contact arm; whereby second actuation of said manually operable member in said first direction moves said one contact toward said other contact;
    said first and said second cam surface means forming a tapered wide mouthed notch having an apex;
    said first and said second cam surface means being shaped for moving said contact arm toward said apex of said notch when said manually operable member is actuated in the first direction.

2. The overload protective device of claim 1, comprising a biasing means connected with said manually operable member for normally biasing said manually operable member in a second direction opposite said first direction.

3. The overload protective device of claim 1, wherein said notch is so positioned that when said manually operable member has been actuated in the first direction so that said contact arm is at the apex of said notch, said toggle is positioned overcenter in a direction which permits closing of said cooperating contacts by means of said toggle when said manually operable member is moved in a direction opposite said first direction.

4. The overload protective device of claim 1 further comprising,
    a tripping device comprising a bimetallic strip heated by a circuit being protected; said contacts being in the circuit being protected; said strip being connected with said toggle, whereby when said strip is heated by an overload condition in the circuit, said strip causes said toggle to operate said one contact out of engagement with the other said contact.

5. The overload protective device of claim 1, wherein said operating mechanism is removable and replaceable with a second operating mechanism comprising,
    a third cam having a third cam surface means and a second manually operable member for operating said third cam in the first direction; said third cam being connected to said second manually operable member; said third cam operating into engagement with said contact arm when said pair of contacts is disengaged for moving said one contact toward the other contact of said pair of contacts; whereby third actuation of said second manually operable member in said first direction moves said one contact toward said other contact.

6. The overload protective device of claim 5, further comprising,
    a housing containing said contacts and said toggle;
    a lock means for said second manually operable member; said second manually operable member having a means for receiving said lock means, which receiving means is positioned on said second manually operable member to receive said lock means after said second manually operable member has been actuated in the first direction a predetermined distance;
    said lock means being mounted to said housing and being movable with respect thereto into said receiving means of said second manually operable member;
    a tripping device comprising a bimetallic strip heated by a circuit being protected; said contacts being in the circuit being protected; said strip being connected with said toggles whereby when said strip is heated by an overload condition in the circuit, said strip causes said toggle to operate said one contact out of engagement with the other said contact.

7. An overload protective device comprising,
    a housing, a pair of cooperating contacts within said housing, an overcenter toggle within said housing for operating one of said contacts into and out of engagement with the other of said contacts; said toggle including a contact arm to which is mounted said one contact of said pair of contacts;

a tripping device comprising a bimetallic strip heated by a circuit being protected; said contacts being in the circuit being protected; said strip being connected with said toggles whereby when said strip is heated by an overload condition in the circuit said strip causes said toggle to operate said one contact out of engagement with the other said contact;

an operating mechanism, said operating mechanism comprising a cam having a cam surface means and a manually operable member for operating said cam in the first direction; said cam being connected to said manually operable member; said cam operating into engagement with said contact arm when said pair of contacts is disengaged for moving said one contact toward the other contact of said pair of contacts; whereby first actuation of said manually operable member in said first direction moves said one contact toward said other contact;

a lock means for said manually operable member; said manually operable member having a means for receiving said lock means, which receiving means is positioned on said manually operable member to receive said lock means after said manually operable member has been actuated in the first direction a predetermined distance;

said lock means being mounted to said housing and being movable with respect thereto into said receiving means of said manually operable member.

8. The overload protective device of claim 7, wherein said lock means is accessible from without said housing to enable said lock means to be moved.

9. The overload protective device of claim 7, wherein said receiving means comprises a notch in said manually operable member; said notch being transverse to said first direction.

10. The overload protective device of claim 7, wherein said cam surface means is shaped and positioned to slidably engage said contact arm.

11. The overload protective device of claim 7, wherein said operating mechanism is removable and replaceable with a second operating mechanism comprising, a second cam having a second cam surface means, a third cam having a third cam surface means; and a second manually operable member for operating said second and third cams in the first direction; said second and third cams being connected to said second manually operable member so as to be simultaneously movable thereby in the first direction; said second cam surface means operating into engagement with said contact arm when said pair of contacts is engaged for moving said one contact out of engagement with said other contact; said second cam surface means being shaped and positioned to slidably engage said contact arm; whereby second actuation of said manually operable member in said first direction moves said one contact out of engagement with said other contact;

said third cam surface operating into engagement with said contact arm when said pair of contacts is disengaged for moving said one contact toward said other contact and toward the apex of a notch formed by said second and said third cam surface means; said third cam surface means being shaped and positioned to slidably engage said contact arm; whereby third actuation of said second manually operable member in said first direction moves said one contact toward said other contact;

said second and said third cam surface means being arranged to form a tapered wide-mounted notch having an apex;

said second and said third cam surface means being so shaped that said contact arm is moved toward said apex of said notch when said manually operable member is actuated in the first direction.

References Cited

UNITED STATES PATENTS

| 996,267 | 6/1911 | Lutz | 200—67 |
|---|---|---|---|
| 1,480,394 | 1/1924 | Johnson | 200—67 |
| 2,752,440 | 6/1956 | Robbins | 200—44 |
| 2,879,345 | 3/1959 | Mossman | 200—172 X |
| 2,899,512 | 8/1959 | Burch | 200—67 |
| 3,038,051 | 6/1962 | Howard | 200—122 |
| 3,101,397 | 8/1963 | Norden | 200—122 |

BERNARD A. GILHEANY, *Primary Examiner.*

H. A. LEWITTER, R. COHRS, *Assistant Examiners.*